March 9, 1948. S. D. DALTON 2,437,383
CRACKING PROCESS
Filed May 2, 1946 3 Sheets-Sheet 2
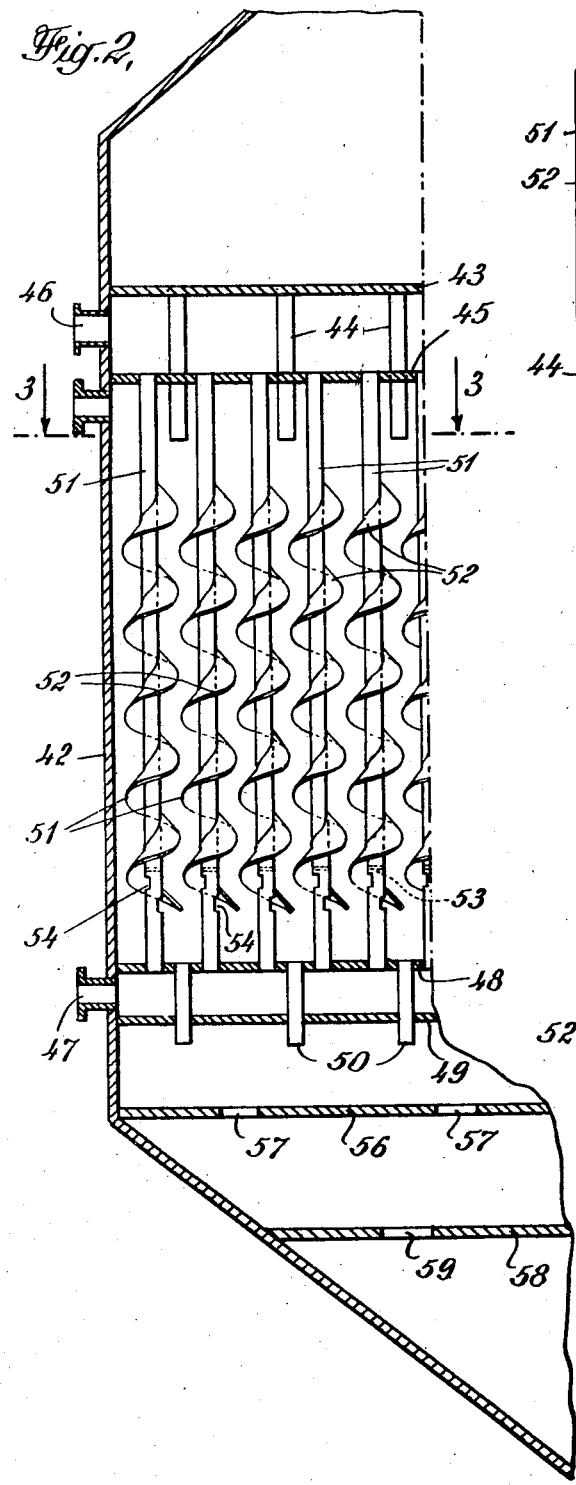
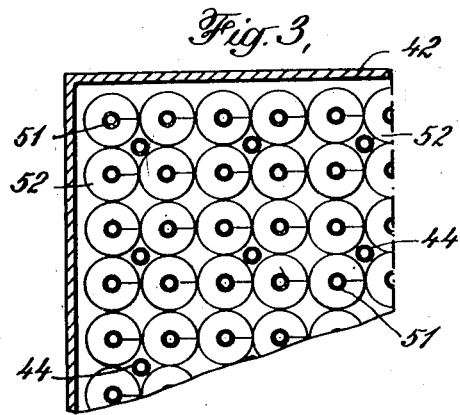
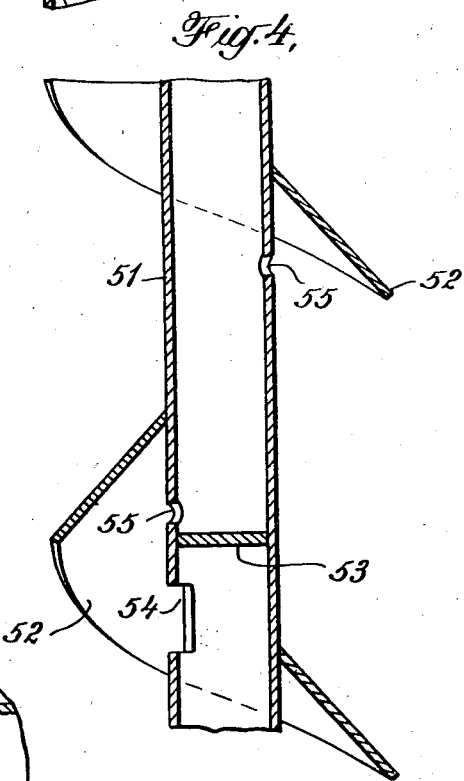
INVENTOR
SWANTON D. DALTON
BY
ATTORNEY March 9, 1948.  S. D. DALTON  2,437,383
CRACKING PROCESS
Filed May 2, 1946  3 Sheets-Sheet 3

INVENTOR
SWANTON D. DALTON
BY
ATTORNEY

Patented Mar. 9, 1948

2,437,383

UNITED STATES PATENT OFFICE 2,437,383

CRACKING PROCESS

Swanton D. Dalton, Summit, N. J., assignor to Socony-Vacuum Oil Company, Incorporated, a corporation of New York Application May 2, 1946, Serial No. 666,796

5 Claims. (Cl. 196—55)

This invention relates to a process for conducting a high temperature short reaction time cracking process wherein the temperature and time of the reaction are controlled by contact with a hot granular solid.

The process of the invention is well adapted to such reactions as the thermal conversion of hydrocarbons to gaseous olefins. For example, gas oils and petroleum crudes are converted largely to ethylene at temperatures on the order of 1500° F. and lighter hydrocarbons may be converted to a similar product at more elevated temperatures, for example by cracking of ethane at 1700° F. At these temperatures, the cracking reaction is extremely rapid and secondary reactions leading to condensation of the olefinic product to produce such secondary products as aromatic hydrocarbons is initiated very soon after the primary reaction and, if the high temperature is maintained, the aromatic by-products are produced in large amounts at the expense of the desired olefin.

The desired high temperature and short reaction time can be obtained by rapidly heating the charge to the desired temperature by direct contact with a body of hot granular solid and thereafter promptly quenching the reaction mixture. According to the present invention this desirable result is obtained by passing highly heated granular solids through a contacting zone having a plurality of sections. In the first section, the charge is rapidly heated to the desired reaction temperature by contact with the highly heated solids. Thereafter the solids which are still at high temperature are further cooled in a second section of the contacting zone and then passed to a third or quenching section in which they serve to cool the hot reaction mixture by direct contact.

The intermediate cooling section can be advantageously utilized for the production of steam or may release its heat to a suitable heat transfer medium by which the heat is conveyed to apparatus capable of making use of the heat thus recovered.

A plant for practising the present invention will normally include some means for heating the granular solids to the desired temperature, which means may be positioned above the reactor containing the above mentioned contacting zone. An elevator is provided to conduct granular solid from which the heat has been extracted from the bottom of the reactor to the heater for recycling in the process. It is desirable that the temperature of the solids handled by the elevator shall be comparatively low in order to minimize mechanical difficulties. In general, the solids leaving the high temperature contacting zone in the top of the reactor are normally too hot for handling in elevators now available. The process of this invention thus provides the further advantage of transferring hot granular solids from the reactor to the elevator at suitable low temperatures, say about 950° F. or below. The quenching step practised according to the present invention results in raising the temperature of the solids leaving the intermediate cooling section and the degree of cooling in the intermediate section must be coordinated with other factors to insure that the discharge temperature of the solid particles is suitably low.

These and other objects and advantages of the invention are more clearly brought out in the description below of apparatus for practising the invention illustrated in the annexed drawings; wherein Figure 1 is a diagrammatic showing of apparatus for practising the process to which the invention is directed;

Figure 2 is a partial vertical section through a heater;

Figure 3 is a partial section on line 3—3 of Figure 2;

Figure 4 is a detail partial section of the flame producing assembly of Figure 2.

Figure 1:
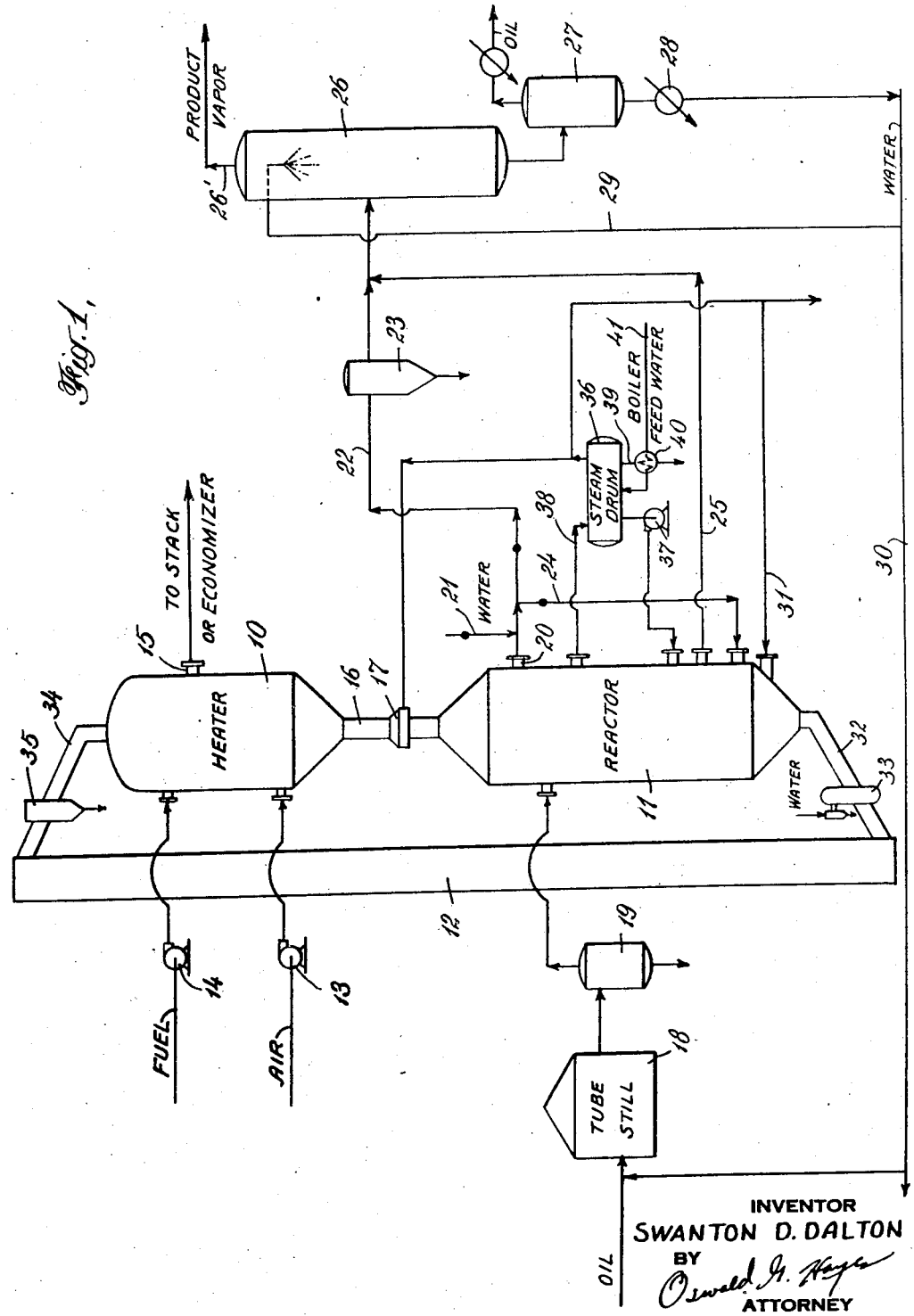

Referring specifically to Figure 1 a suitable granular solid such as fused alumina pellets having an average diameter of about 0.3 inch is circulated in a closed path including a heater 10, a reactor 11, and an elevator 12. Fuel and preheated air are admitted from pumps 13 and 14 respectively to the heater 10 wherein a flame produced by combustion of the fuel heats the moving bed of graular solids in heater 10, exhaust gases being withdrawn at 15 and passed to a suitable stack or economizer. The highly heated solids flow downwardly through a feed leg 16 through a steam sealing zone 17 to the reactor 11 wherein they are contacted with a fluid charge such as preheated oil vapors from tube still 18 and vapor separator 19. The highly heated vapors are withdrawn at 20 and are then preferably quenched to a temperature which will substantially reduce the reaction velocity by water introduced from line 21.

The apparatus shown here is capable of conducting the major quench by water from line 21 after which the vapors are transferred by line 22 to a tar separator 23, from which the vapors may be conducted to further purification steps as described hereafter in connection with the preferred operation. According to the preferred embodiment the partially quenched vapors are conducted by line 24 to the lower part of the reactor 11 wherein they are passed in direct contact with cold granular solid and are withdrawn by line 25 and transferred to a spray condenser 26 wherein a spray of water or other suitable medium such as cold oil, reduces the temperature of the vapors to a point at which normally gaseous products may be separated from normally liquid materials, say 100° F. The normally gaseous material is withdrawn from condenser 26 by overhead line 26' and passed to a suitable gas plant for recovery and purification of its components. A mixture of water and oil is withdrawn from the bottom of condenser 26 and passed to a settler 27 from which oil is withdrawn, cooled and treated to recover various components such as aromatic gasolines and naphthas. Water withdrawn from the bottom of settler 27 is cooled in heat exchanger 28 and may then be recycled in whole or part for reuse as by line 29 to the spray condenser and line 30 which supplied water to be mixed with the oil and thus furnish steam for the reaction in view of the fact that water vapor aids the course of the reaction.

Returning now to the granular solid cycle, purging steam may be introduced to the bottom of the reactor 11 from line 31 and the purged solids are then transferred by a conduit 32 through a depressuring pot 33 to the elevator 12. From the top of elevator 12, the solids are conveyed by a conduit 34 having a suitable separator 35 for removal of particles which have been broken down to a size smaller than that desired.

The intermediate section of the reactor 11 is provided with heat transfer tubes for passing a heat exchange medium in indirect heat exchange relationship with the granular solids therein. A steam drum 36 supplies water for circulation through the heat transfer tubes by pump 37, vapors generated in reactor 11 being returned to the steam drum by line 38. Process steam may be drawn from the steam drum to supply steam sealing zone 17 and the steam purge line 31, leaving an excess of steam which can be diverted for other plant uses. As shown, blow-down line 39 is equipped with a heat exchanger 40 for preheating boiler feed water from line 41.

The structure of the heater is shown in Figures 2 to 4. A shell 42 is fitted with suitable inlet and outlet means (not shown in Figure 2) to produce a moving bed of granular solids in the heater 10. The granular solids supplied at the top fall onto a tube sheet 43 which defines the lower surface of a feed hopper from which solids are withdrawn by feed pipes 44 for supply to the heating section. A manifold is provided for supplying one of the components of the flame used to heat the solids and, as shown, the manifold is defined by tube sheet 43 and plate 45. A suitable connection 46 is provided for admission of a gas to this upper manifold. A similar manifold, supplied by inlet 47 is defined at the bottom of the heating section by a tube sheet 48 and plate 49. Feed tubes 50 provide for withdrawal of granular solids from the heating section.

The heating section is provided with means for baffling the downwardly moving mass of granular solids in a manner to provide a plurality of continuous paths through the bed, which paths are substantially free of solid particles thus permitting gases to flow in direct contact with solid particles but without forcing their way through a compact bed of particles in the baffled region. Various types of baffles for this purpose are shown in U. S. Patent No. 2,227,416, issued December 31, 1940, to John W. Payne. Although any of the forms of baffling shown in that patent may be used, the helical fin baffle is particularly well adapted to the present purpose and that form is shown herein. The flame components, namely air and fuel, are supplied through the inlets 46 and 47 to the respective manifolds between which extend a number of tubes 51 for supplying the flame components to the heating section. It is desirable that the temperature of the flame produced by combustion of the fuel shall not exceed the fusion temperature of the solid, and, since the flame components are normally preheated before admission at 46 and 47 and, since those components are further preheated by passage through tubes 51, the temperature of the flame is maintained within the desired limits by introducing one of the flame components in relatively small increments thereby permitting dissipation of heat of combustion and giving a partially consumed mixture to which the next increment can be added without producing unduly hot flames.

As shown in the drawings this desirable result is achieved by introducing substantially all of one flame component from orifices in tubes 51 over a relatively short portion of the path defined by helical baffles 52 about the tubes 51. A plug 53 near the bottom of each tube 51 insures that only the lower portion of the tube is open to the lower manifold while the major portion of the tube functions as an inlet from the upper manifold. Large orifices 54 allow all the flame components from the lower manifold to be admitted over a short space of the path beneath the baffle. Above the plug 53 are a large number of smaller orifices 55 which admit the flame component from the upper manifold to the path under the helical baffle in relatively short increments. It is of course possible to introduce either flame component in increments and, as shown here, the air is introduced from the bottom and the fuel is added in small increments along the tortuous path beneath the baffle. Any fluid fuel can be used, but, due to the high temperatures involved, liquid fuels tend to coke in the tubes and plug the orifices 55, for which reason gaseous fuels are much preferred. The highly heated solids are discharged from pipe 50 onto a plate 56 having openings 57 which induce equal flow from the pipes 50 adjacent thereto. Plate 58 having openings 59 functions in a similar manner to control flow from the openings 57 and thus give a constant rate of flow through the heating section.

Figure 5:
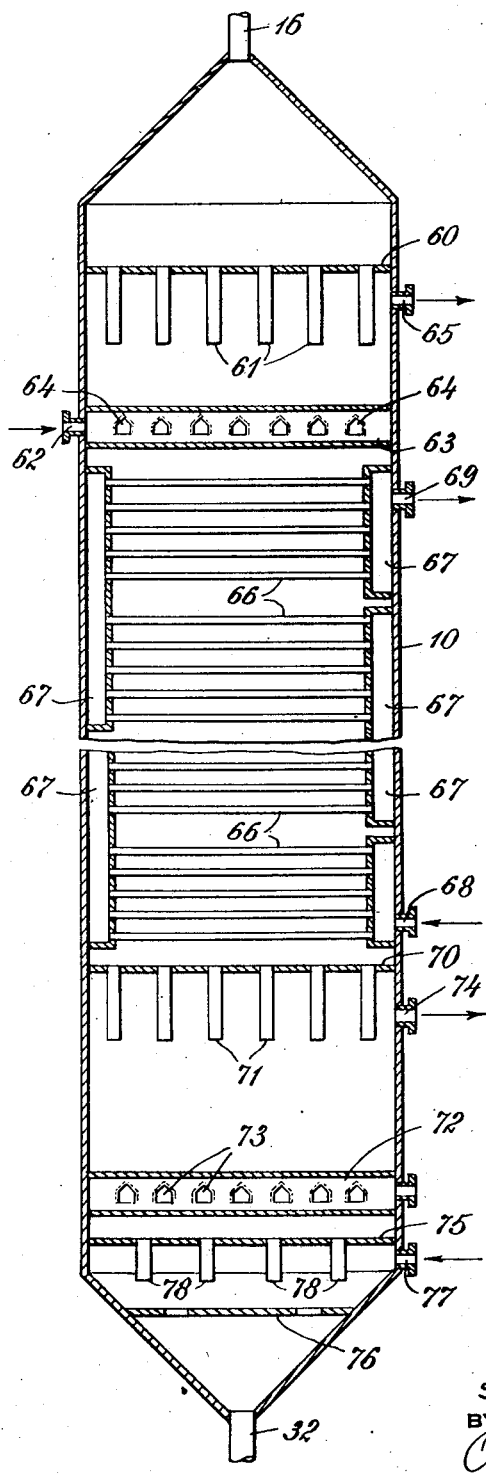
Figure 5 is a vertical section of a suitable reactor.

Turning now to Figure 5, the highly heated solids pass from feed leg 16 into a hopper in the top of reactor 10 defined by a tube sheet 60 from which depend a number of feed legs 61 to give uniform feeding across the top of the reactor. The hydrocarbon charge enters by inlet connection 62 to a header 63 from which extend a plurality of feed troughs 64 open at the bottom. The charge is thus evenly distributed through the mass of hot granular solids and passes upwardly therethrough to the open space about the feed tubes 61 from which it is withdrawn by outlet connection 65. Below the header 63 are banks of heat exchange tubes 66 which communicate with a series of manifolds 67 which induce flow of the heat exchange medium through the tubes in series between inlet 68 and outlet 69. The solids cooled in this manner fall onto a tube sheet 70 from which they pass by feed tubes 71 to the quenching zone wherein they are contacted by the hot reaction mixture supplied through header 72 and distributing troughs 73. The quenched product is withdrawn from the open space about tubes 71 through an outlet connection 74. The bottom of the reactor is provided with flow control plates 75 and 76 similar in function to the elements 48, 56 and 58 of Figure 2. Purge steam is advantageously induced by inlet 77 below plate 75 to an open space provided by tubes 78.

In a typical operation a mixture of steam and gas oil vapor containing about 33% by weight of water is admitted to the top section of the reactor at 625° F. Fused alumina pellets of 0.3 inch average diameter are admitted from the feed leg at 1546° F. at a solids to oil weight ratio of 11.95. The depth of bed contacted by the charge is 24 inches and a space velocity of 3.12 volumes of liquid oil at 60° F. per volume of reaction space per hour is maintained. This gives a mean effective temperature of 1440° F. at a contact time of 0.29 second. The heated reaction mixture is promptly quenched with water to reduce its temperature from 1545° F. to 1200° F. at which temperature it is transferred to the quench section and cooled therein to 572° F. The quenched reaction mixture is transferred directly to the spray condenser wherein it is cooled to 100° F. by contact with water at 90° F. Among the products produced are 28.1% by weight of ethylene together with substantial yields of other olefins. Among the liquid products are 5.5% of depentanized motor gasoline having an end point of 416° F. and an octane number of 94.6 with 3 cc. of tetraethyl lead per gallon.

The granular solid enters the heat exchange section at 1040° F. wherein it generates steam under a pressure of 175 lbs. per square inch gauge and leaves the heat exchange section at 570° F. The granular solid is heated to 765° F. in the quench section and reenters the heater at 730° F. wherein it is heated to 1575° F. for return to the reactor.

I claim:

1. A process for conversion of hydrocarbons by contact with a hot granular solid at conversion temperature followed by cooling the reaction mixture below conversion temperature which comprises heating said solid to a temperature in excess of the said conversion temperature, passing the heated solid downwardly through a contacting zone including an upper reaction section, an intermediate cooling section and a lower quenching section, passing hydrocarbon reactants in direct contact with hot granular solid in said reaction section to produce vapors heated to reaction temperature, removing the hot vapors from said reaction section, passing the removed vapors in direct contact with granular solid in said quenching section to thereby reduce the temperature of said vapors and circulating a fluid heat exchange medium in indirect heat exchange relationship with said solid in said cooling section to reduce the temperature of the said solid therein.

2. The process of claim 1 wherein a fluid quench medium is added to said hot vapors removed from said reaction section to partially cool the same before admission to said quench section.

3. The process of claim 2 wherein said granular solid enters said contacting zone at a temperature in excess of about 1500° F. and is discharged therefrom at a temperature below about 950° F.

4. The process of claim 1 wherein said granular solid enters said contacting zone at a temperature in excess of about 1500° F. and is discharged therefrom at a temperature below about 950° F.

5. In a contactor for cracking hydrocarbons by contact with hot granular solid, a vertical contacting vessel, means to admit granular solid to the top of said vessel, means to withdraw granular solid from the bottom of said vessel, a plurality of heat exhange tubes in an intermediate portion of said vessel, means to circulate a fluid heat transfer medium through said tubes, upper fluid distributing means in said vessel above said tubes, upper fluid collecting means in said vessel above said upper fluid distributing means, lower fluid collecting means in said vessel below said tubes, lower fluid distributing means in said vessel below said lower fluid collecting means, and means to transfer vapors from said upper fluid collecting means to said lower fluid distributing means.

SWANTON D. DALTON.

REFERENCES CITED

The following references are of record in the file of this patent:

UNITED STATES PATENTS

| Number | Name | Date |
| --- | --- | --- |
| 2,389,636 | Ramseyer | Nov. 27, 1945 |